United States Patent
Kim et al.

(10) Patent No.: US 12,332,215 B2
(45) Date of Patent: Jun. 17, 2025

(54) MODE CONVERSION REFLECTOR

(71) Applicants: Seoul National University R&DB Foundation, Seoul (KR); CENTER FOR ADVANCED META-MATERIALS, Daejeon (KR); The Industry & Academic Cooperation in Chungnam National University (IAC), Daejeon (KR)

(72) Inventors: Yoon Young Kim, Seoul (KR); Yu Bin Oh, Seoul (KR); Shin Young Kim, Seoul (KR); Joong Seok Lee, Daejeon (KR)

(73) Assignees: SEOUL NATIONAL UNIVERSITY R&DB FOUNDATION, Seoul (KR); CENTER FOR ADVANCED META-MATERIALS, Daejeon (KR); THE INDUSTRY & ACADEMIC COOPERATION IN CHUNGNAM NATIONAL UNIVERSITY (IAC), Daejeon (KR)

(*) Notice: Subject to any disclaimer, the term of this patent is extended or adjusted under 35 U.S.C. 154(b) by 337 days.

(21) Appl. No.: 18/095,112

(22) Filed: Jan. 10, 2023

(65) Prior Publication Data
US 2023/0280313 A1    Sep. 7, 2023

(30) Foreign Application Priority Data

Jan. 27, 2022    (KR) .................. 10-2022-0012716

(51) Int. Cl.
*G01N 29/22*    (2006.01)
*G01F 1/66*    (2022.01)
(Continued)

(52) U.S. Cl.
CPC ........... *G01N 29/221* (2013.01); *G01F 1/667* (2013.01); *G01F 1/662* (2013.01); *G01N 29/04* (2013.01);
(Continued)

(58) Field of Classification Search
CPC ......... G01N 29/221; G01N 2291/0428; G01N 2291/045; G01N 29/04; G01N 2291/044; G01N 2291/101; G01F 1/667; G01F 1/662
(Continued)

(56) References Cited

U.S. PATENT DOCUMENTS

| 9,091,638 | B2 | 7/2015 | Frederick et al. |
| 2008/0127732 | A1 | 6/2008 | Owens et al. |
| 2011/0296923 | A1* | 12/2011 | Cataldo ............... G01N 29/262 73/632 |

FOREIGN PATENT DOCUMENTS

| CA | 2749405 | 8/2010 |
| EP | 2266714 | 12/2010 |

(Continued)

OTHER PUBLICATIONS

Andrea Colombi et al., "A seismic metamaterial: The resonant metawedge," Scientific Reports, vol. 6, Jun. 10, 2016, doi: 10.1038/srep27717.
(Continued)

*Primary Examiner* — Peter J Macchiarolo
*Assistant Examiner* — John M Royston
(74) *Attorney, Agent, or Firm* — LEX IP MEISTER, PLLC

(57) ABSTRACT

The present invention provides a mode conversion reflector provided on an edge surface of an elastic medium, capable of mode-converting an incident ultrasonic wave with high efficiency and simultaneously reflecting the wave in a
(Continued)

desired direction. The mode conversion reflector according to the embodiment includes an elastic medium; and a reflective layer formed of a non-planar structure on an edge surface of the elastic medium, in which an interference phenomenon caused by diffraction of wave occurs by the reflective layer, so that an ultrasonic wave incident through the elastic medium is mode-converted and reflected in a predetermined direction.

7 Claims, 13 Drawing Sheets

(51) Int. Cl.
  *G01F 1/667* (2022.01)
  *G01N 29/04* (2006.01)
(52) U.S. Cl.
  CPC .............. *G01N 2291/0428* (2013.01); *G01N 2291/044* (2013.01); *G01N 2291/045* (2013.01); *G01N 2291/101* (2013.01)
(58) Field of Classification Search
  USPC .......................................... 73/584, 649, 596
  See application file for complete search history.

(56) References Cited

FOREIGN PATENT DOCUMENTS

| KR | 10-2007-0046441 | 5/2007 |
|---|---|---|
| KR | 10-1134431 | 4/2012 |
| KR | 10-1807553 | 1/2018 |
| KR | 10-1856201 | 5/2018 |
| KR | 10-2037692 | 11/2019 |
| KR | 10-2021-0123945 | 10/2021 |

OTHER PUBLICATIONS

Liyun Cao et al., "Flexural wave absorption by lossy gradient elastic metasurface," Journal of the Mechanics and Physics of Solids, vol. 143, p. 104052, Oct. 2020, doi: 10.1016/j.jmps.2020.104052.
Liyun Cao et al., "Disordered Elastic Metasurfaces," Physical Review Applied, vol. 13, No. 1, Jan. 28, 2020, doi: 10.1103/physrevapplied.13.014054.
Yan Kei Chiang et al., "Reconfigurable Acoustic Metagrating for High-Efficiency Anomalous Reflection," Physical Review Applied, vol. 13, No. 6, Jun. 29, 2020, doi: 10.1103/physrevapplied.13.064067.
Steven R. Craig et al., "Experimental Realization of Acoustic Bianisotropic Gratings," Physical Review Applied, vol. 11, No. 6, Jun. 6, 2019, doi: 10.1103/physrevapplied.11.061002.
D. J. Colquitt et al., "Seismic metasurfaces: Sub-wavelength resonators and Rayleigh wave interaction," Journal of the Mechanics and Physics of Solids, vol. 99, pp. 379-393, Feb. 2017, doi: 10.1016/j.jmps.2016.12.004.
Ariel Epstein et al., "Unveiling the Properties of Metagratings via a Detailed Analytical Model for Synthesis and Analysis," Physical Review Applied, vol. 8, No. 5, Nov. 20, 2017, doi: 10.1103/physrevapplied.8.054037.
Lijuan Fan et al., "Metagratings for Waterborne Sound: Various Functionalities Enabled by an Efficient Inverse-Design Approach," Physical Review Applied, vol. 14, No. 4, Oct. 2, 2020, doi: 10.1103/physrevapplied.14.044003.
Lijuan Fan et al., "Acoustic Metagrating Circulators: Nonreciprocal, Robust, and Tunable Manipulation with Unitary Efficiency," Physical Review Applied, vol. 15, No. 6, Jun. 1, 2021, doi: 10.1103/physrevapplied.15.064002.
Zhilin Hou et al., "Acoustic Vortices via Nonlocal Metagratings," Physical Review Applied, vol. 16, No. 1, Jul. 1, 2021, doi: 10.1103/physrevapplied.16.014002.
Jiajie He et al., "Experimental demonstration of underwater ultrasound cloaking based on metagrating," Applied Physics Letters, vol. 117, p. 091901, Aug. 31, 2020, doi: 10.1063/5.0021002.
Yabin Jin et al., "Engineered Diffraction Gratings for Acoustic Cloaking," Physical Review Applied, vol. 11, No. 1, Jan. 25, 2019, doi: 10.1103/physrevapplied.11.011004.
Min Soo Kim et al., "Transmodal elastic metasurface for broad angle total mode conversion," Applied Physics Letters, vol. 112, No. 24, p. 241905, Jun. 15, 2018, doi: 10.1063/1.5032157.
Min Soo Kim et al., "Elastic Wave Energy Entrapment for Reflectionless Metasurface," Physical Review Applied, vol. 13, No. 5, May 15, 2020, doi: 10.1103/physrevapplied.13.054036.
Shin Young Kim et al., "Longitudinal wave steering using beam-type elastic metagratings," Mechanical Systems and Signal Processing, vol. 156, p. 107688, Jul. 2021, doi: 10.1016/j.ymssp.2021.107688.
Shin Young Kim et al., "Anomalous mode-converting reflection of elastic waves using strip-type metagratings," Mechanical Systems and Signal Processing, vol. 186, p. 109867, Mar. 2023, doi: 10.1016/j.ymssp.2022.109867.
Joshua Minwoo Kweun et al., "Transmodal Fabry-Pérot Resonance: Theory and Realization with Elastic Metamaterials," Physical Review Letters, vol. 118, No. 20, May 19, 2017, doi: 10.1103/physrevlett.118.205901.
Stéphane Larouche et al., "Reconciliation of generalized refraction with diffraction theory," Optics Letters, vol. 37, No. 12, Jun. 15, 2012.
Hyuk Lee et al., "Mass-stiffness substructuring of an elastic metasurface for full transmission beam steering," Journal of the Mechanics and Physics of Solids, vol. 112, pp. 577-593, Mar. 2018, doi: 10.1016/j.jmps.2017.11.025.
Hyung Jin Lee et al., "Off-centered Double-slit Metamaterial for Elastic Wave Polarization Anomaly," Scientific Reports, vol. 7, Nov. 17, 2017, doi: 10.1038/s41598-017-15746-2.
Sung Won Lee et al., "Broad-angle refractive transmodal elastic metasurface," Applied Physics Letters, vol. 117, No. 21, p. 213502, Nov. 2020, doi: 10.1063/5.0026928.
Jeseung Lee et al., "Perfect transmission of elastic waves obliquely incident at solid-solid interfaces," Extreme Mechanics Letters, vol. 51, p. 101606, Feb. 2022, doi: 10.1016/j.eml.2022.101606.
Huiqin Ni et al., "High-efficiency anomalous splitter by acoustic meta-grating," Physical Review B, vol. 100, No. 10, Sep. 6, 2019, doi: 10.1103/physrevb.100.104104.
Pawel Packo et al., "Inverse Grating Problem: Efficient Design of Anomalous Flexural Wave Reflectors and Refractors," Physical Review Applied, vol. 11, No. 1, Jan. 11, 2019, doi: 10.1103/physrevapplied.11.014023.
Pawel Packo et al., "Metaclusters for the Full Control of Mechanical Waves," Physical Review Applied, vol. 15, No. 1, Jan. 27, 2021, doi: 10.1103/physrevapplied.15.014051.
Chunguang Piao et al., "Ultrasonic flow measurement using a high-efficiency longitudinal-to-shear wave mode-converting meta-slab wedge," Sensors and Actuators A: Physical, vol. 310, p. 112080, Aug. 2020, doi: 10.1016/j.sna.2020.112080.
Oshri Rabinovich et al., "Analytical Design of Printed Circuit Board (PCB) Metagratings for Perfect Anomalous Reflection," IEEE Transactions on Antennas and Propagation, vol. 66, No. 8, pp. 4086-4095, Aug. 2018, doi: 10.1109/tap.2018.2836379.
Younes Ra'di et al., "Metagratings: Beyond the Limits of Graded Metasurfaces for Wave Front Control," Physical Review Letters, vol. 119, No. 6, Aug. 10, 2017, doi: 10.1103/physrevlett.119.067404.
Shuzo Asano, "Reflection and refraction of elastic waves at a corrugated interface," Bulletin of the Seismological Society of America, vol. 56, No. 1, pp. 201-221, Feb. 1966.
Krister Svanberg, "The method of moving asymptotes—A new method for structural optimization," International Journal for Numerical Methods in Engineering, vol. 24, 359-373 (1987).

(56) References Cited

OTHER PUBLICATIONS

Zhenhua Tian et al., "Elastic Phased Diffraction Gratings for Manipulation of Ultrasonic Guided Waves in Solids," Physical Review Applied, vol. 11, No. 2, Feb. 21, 2019, doi: 10.1103/physrevapplied.11.024052.

Daniel Torrent, "Acoustic anomalous reflectors based on diffraction grating engineering," Physical Review B, vol. 98, No. 6, Aug. 6, 2018, doi: 10.1103/physrevb.98.060101.

Madislav Popov et al., "Controlling Diffraction Patterns with Metagratings," Physical Review Applied, vol. 10, No. 1, Jul. 24, 2018, doi: 10.1103/physrevapplied.10.011002.

Alex M. H. Wong et al., "Perfect Anomalous Reflection with a Bipartite Huygens' Metasurface," Physical Review X, vol. 8, No. 1, Feb. 28, 2018, doi: 10.1103/physrevx.8.011036.

Ying Wu et al., "Elastic Metamaterials with Simultaneously Negative Effective Shear Modulus and Mass Density," Physical Review Letters, vol. 107, No. 10, Sep. 2, 2011, doi: 10.1103/physrevlett.107.105506.

Xiaoshi Su et al., "Elastic metasurfaces for splitting SV- and P-waves in elastic solids," Journal of Applied Physics, vol. 123, No. 9, p. 091701, Mar. 2018, doi: 10.1063/1.5007731.

Nanfang Yu et al., "Light Propagation with Phase Discontinuities: Generalized Laws of Reflection and Refraction," Scienc, vol. 334, Oct. 21, 2011.

Long-Sheng Zeng et al., "Experimental realization of ultrasonic retroreflection tweezing via metagratings," Ultrasonics, vol. 117, p. 106548, Dec. 2021, doi: 10.1016/j.ultras.2021.106548.

R. Zhu et al., "Negative refraction of elastic waves at the deep-subwavelength scale in a single-phase metamaterial," Nature Communications, vol. 5, Nov. 24, 2014, doi: 10.1038/ncomms6510.

Li Quan et al., "Maximum Willis Coupling in Acoustic Scatterers," Physical Review Letters, vol. 120, No. 25, Jun. 20, 2018, doi: 10.1103/physrevlett.120.254301.

Zhilin Hou et al., "Highly efficient acoustic metagrating with strongly coupled surface grooves" Physical Review Applied 12.3 (2019): 034021, Sep. 12, 2019, total 11 pages.

\* cited by examiner

MODE CONVERSION REFLECTOR

CROSS-REFERENCE TO RELATED APPLICATION

This application claims priority to and the benefit of Korean Patent Application No. 10-2022-0012716 filed in the Korean Intellectual Property Office on Jan. 27, 2022, the entire contents of which are incorporated herein by reference.

BACKGROUND OF THE INVENTION

(a) Field of the Invention

The present invention relates to a mode conversion reflector.

(b) Description of the Related Art

Technology for controlling types and directions of ultrasonic waves controls the waves using inclined structures such as a wedge. It is very important to convert ultrasonic waves into desired types within an elastic medium and arbitrarily control directions in which ultrasonic waves propagate in the ultrasonic non-destructive testing industry. This is because ultrasonic waves need to be transmitted to a desired location in the ultrasonic non-destructive testing industry. In general, the types and directions of ultrasonic waves are controlled using reflection and transmission phenomena of the waves that occur at the interface, and in a typical elastic medium, these phenomena are complex. For example, in the reflection phenomenon, when a longitudinal or transverse wave is incident on a free boundary, the longitudinal and transverse waves are simultaneously reflected by the law of reflection in the elastic medium.

The intrinsic characteristics of the elastic medium in which two types of waves occur inevitably lead to a decrease in a transmission efficiency of the waves. In the related arts for controlling the types and directions of ultrasonic waves, there is the technology for controlling the directions of ultrasonic waves using the geometric and physical properties of medium which has an inclined structure such as wedges and a structure designed to have curved surfaces as well as using the laws of reflection and refraction, and the latest technology for controlling the directions of ultrasonic waves using a phased array transducer.

However, the conventional technologies described above are widely used in the field of industrial ultrasonic non-destructive testing and flow metering, but have a low propagation efficiency of waves due to a low transmittance of waves of structures and media.

When using a variable incident angle wedge, there is an adhesion problem between the wedge and the medium, and when using the phased array ultrasonic wave transducer, there is a problem in that the volume of the entire equipment may increase because additional electromagnetic equipment is required. In addition, when a periodic structure such as a metamaterial is installed, a higher-order diffraction mode in which intensity of the wave increases at a specific angle is generated by the diffraction interference phenomenon. Accordingly, characteristics of the medium in which two types of waves are generated and higher order diffraction mode generated by a periodicity of the structure cause a low transmission efficiency of the waves. Therefore, it is necessary to develop a high-efficiency non-destructive testing equipment that overcomes the low transmission efficiency of the waves.

The above information disclosed in this Background section is only for enhancement of understanding of the background of the invention, and therefore it may contain information that does not form the prior art that is already known in this country to a person of ordinary skill in the art.

SUMMARY OF THE INVENTION

One embodiment of the present invention provides a mode conversion reflector capable of mode-converting ultrasonic waves incident on an edge surface of an elastic medium with high efficiency and simultaneously reflecting the ultrasonic waves into a desired direction.

The mode conversion reflector according to the embodiment of the present invention may include an elastic medium; and a reflective layer formed of a non-planar structure on an edge surface of the elastic medium and configured to mode-convert an ultrasonic wave incident through the elastic medium by an interference phenomenon caused by diffraction of the wave and reflect the incident ultrasonic wave into a predetermined direction.

The reflective layer may include a meta-grating surface structure of a concavo-convex shape which has an adjustable plurality of design variables.

The reflective layer may have a plurality of convex-shaped protruding structures along a longitudinal direction in a unit structure.

The unit structure may include at least two or more units along the longitudinal direction.

The reflective layer may be provided in a form in which two convex-shaped protruding structures have different protruding lengths and are periodically repeated along the longitudinal direction in the unit structure.

A plurality of design variables may include a horizontal length (a) of the unit structure, a width ($d_1$) of a first protruding structure, a length ($l_1$) of the first protruding structure, a width ($d_2$) of a second protruding structure, a length ($l_2$) of the second protruding structure, and an interval ($\alpha_{12}$) of the first protruding structure and the second protruding structure.

The reflective layer may be provided in a form in which three convex-shaped protruding structures have different protruding lengths and are periodically repeated along the longitudinal direction in the unit structure.

A plurality of design variables may include the horizontal length (a) of the unit structure, the width ($d_1$) of the first protruding structure, the length ($l_1$) of the first protruding structure, the width ($d_2$) of the second protruding structure, the length ($l_2$) of the second protruding structure, a width ($d_3$) of a third protruding structure, a length ($l_3$) of a third protruding structure, the interval ($\alpha_{12}$) between the first protruding structure and the second protruding structure, and an interval ($\alpha_{13}$) between the first protruding structure and the third protruding structure.

The reflective layer may include a plurality of concave-shaped recessed structures along the longitudinal direction in the unit structure.

Since a concavo-convex structure is provided on the edge surface of the elastic medium, an influence of a high-order diffraction mode observed in the periodic structure is effectively controlled, such that the incident ultrasonic wave may be mode-converted with high efficiency and reflected in a desired direction.

DETAILED DESCRIPTION OF THE EMBODIMENTS

The technical terms used herein are merely for the purpose of describing a specific exemplary embodiment, and not intended to limit the present invention. Singular expressions used herein include plural expressions unless they have definitely opposite meanings. The terms "comprises" and/or "comprising" used in the specification specify particular features, regions, integers, steps, operations, elements, and/or components, but do not exclude the presence or addition of other particular features, regions integers, steps, operations, elements, components, and/or groups thereof.

Unless otherwise defined, all terms used herein including technical or scientific terms have the same meanings as meanings which are generally understood by those skilled in the art. It shall be additionally construed that terms, which are defined in dictionaries generally used, have meanings matching the related art document and currently disclosed contents, and the terms shall not be construed as ideal or excessively formal meanings unless clearly defined in the present application.

Hereinafter, an exemplary embodiment of the present invention will be described in detail with reference to the accompanying drawings so that those skilled in the technical field to which the present invention pertains may easily carry out the exemplary embodiment. However, the present invention may be implemented in various different ways and is not limited to the embodiments described herein.

A mode conversion reflector according to an embodiment includes an elastic medium and a reflective layer formed of a non-planar structure on an edge surface of the elastic medium. An interference phenomenon due to diffraction of wave occurs by the reflective layer, and an ultrasonic wave incident through the elastic medium is mode-converted and reflected in a predetermined direction. For example, the reflective layer may include a meta-grating surface structure of a concavo-convex shape having a plurality of adjustable design variables.

The mode conversion reflector according to the embodiment includes the meta-grating surface structure in which a structure of a concavo-convex shape, which is convenient to be manufactured, is designed and disposed inside a periodically arranged unit structure. Accordingly, an influence of a high-order diffraction mode observed in the periodic structure is controlled, so that an ultrasonic wave may be mode-converted with high efficiency and reflected in a desired direction. Compared to the related art, the mode conversion reflector according to the embodiment controls all types, sizes, and directions of wave, thereby increasing a transmission efficiency of wave to be transmitted in a desired direction, and easily being designed and manufactured with a simple concavo-convex shape.

Figure 1A:
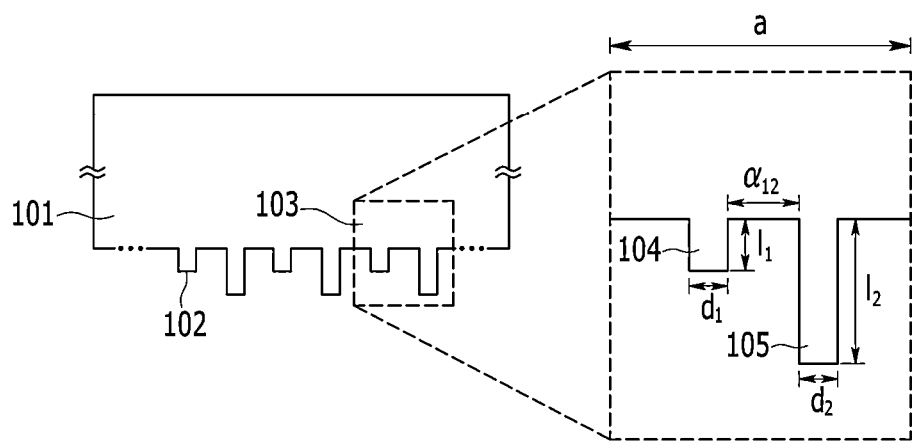
FIG. 1A is a view illustrating a protruding structure of a mode conversion reflector according to an embodiment.
Figure 1B:
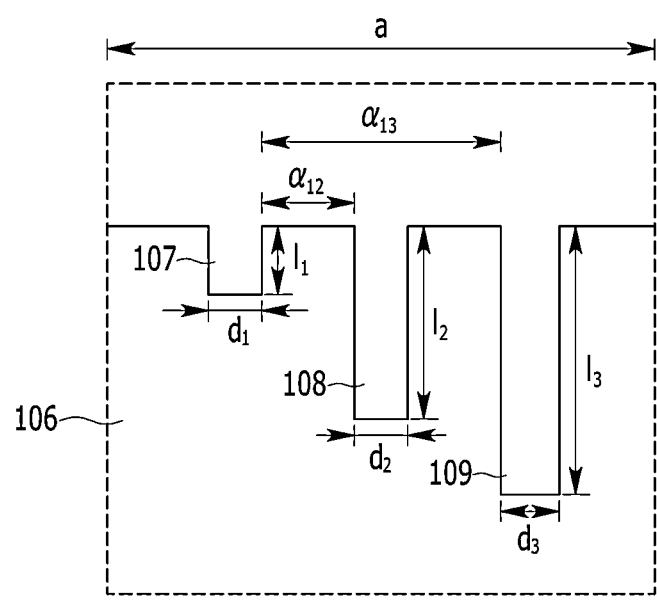
FIG. 1B is a view illustrating a modified example of FIG. 1A.

The meta-grating surface structure of the mode conversion reflector according to the embodiment may be configured in a periodically repeated form in which two or three protruding or recessed concave-convex structures are disposed inside the unit structure. Further, the meta-grating surface structure may include six and nine adjustable design variables, respectively. FIGS. 1A and 1B illustrate conceptual views of protruding meta-grating surface structures of the mode conversion reflector according to the embodiment.

FIG. 1A illustrates the protruding meta-grating surface structure 101 and a corresponding unit structure 103 of the mode conversion reflector according to the embodiment. In detail, the mode conversion reflector is a structure in which two convex-shaped protruding structures 102 are designed in a unit structure 103 and are periodically arranged. Adjustable design variables may include a horizontal length (a) of the unit structure 103, a width ($d_1$) of a first protruding structure 104, a length ($l_1$) of the first protruding structure 104, a width ($d_2$) of a second protruding structure 105, a length ($l_2$) of the second protruding structure 105, and an interval ($\alpha_{12}$) between the first protruding structure 104 and the second protruding structure 105.

FIG. 1B illustrates a unit structure 106 of the meta-grating surface structure in which three convex-shaped protruding structures are designed and periodically repeated. In this case, adjustable design variables may include a horizontal length (a) of the unit structure 106, a width ($d_1$) of a first protruding structure 107, a length ($l_1$) of the first protruding structure 107, and a width ($d_2$) of a second protruding structure 108, a length ($l_2$) of the second protruding structure 108, a width ($d_3$) of a third protruding structure 109, a length ($l_3$) of the third protruding structure 109, the interval ($\alpha_{12}$) of the first protruding structure 107 and the second protruding structure 108, and an interval ($\alpha_{13}$) of the first protruding structure 107 and the third protruding structure 109.

The constituent material of the meta-grating surface structure 101 may be selected the same as the incident elastic medium. The convex-shaped protruding structure may be manufactured by cutting a raw material through mechanical processing and laser cutting.

The concavo-convex structure of the meta-grating surface structure may be designed as a concave-shaped recessed structure depending on the structure situation, and FIG. 2 illustrates conceptual views thereof.

Figure 2A:
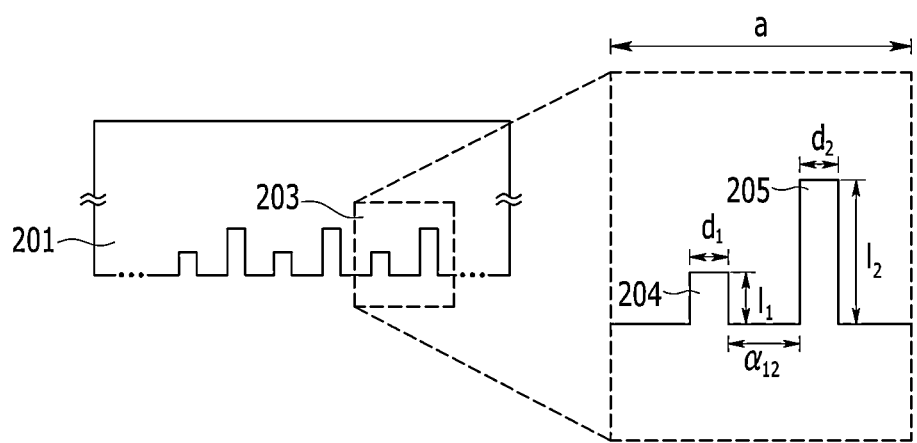
FIG. 2A is a view illustrating a recessed structure of the mode conversion reflector according to the embodiment.

FIG. 2A illustrates a recessed meta-grating surface structure 201 and a corresponding unit structure 203 of the mode conversion reflector according to the embodiment. In detail, the recessed meta-grating surface structure 201 is a structure in which two concave-shaped recessed structures 202 are designed and periodically arranged inside the unit structure 203, and an adjustable design variable may include a horizontal length (a) of the unit structure 203, a width ($d_1$) of a first recessed structure 204, a length ($l_1$) of the first recessed structure 204, a width ($d_2$) of a second recessed structure 205, a length ($l_2$) of the second recessed structure 205 and an interval ($\alpha_{12}$) between the first recessed structure 204 and the second recessed structure 205.

Figure 2B:
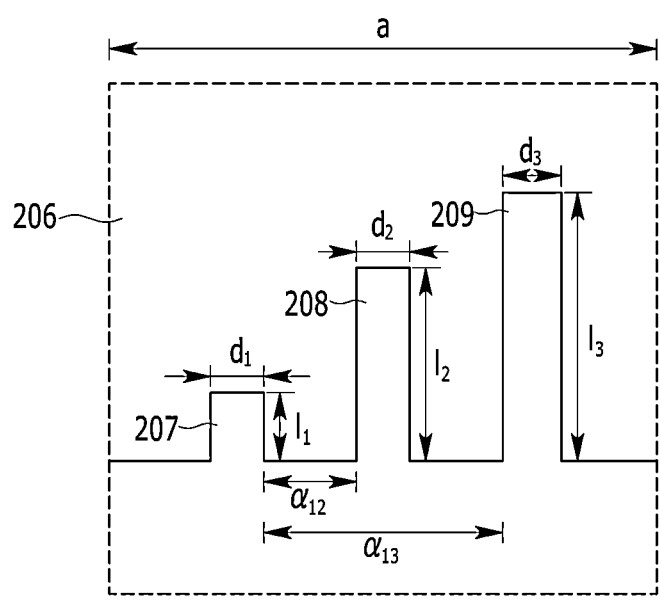
FIG. 2B is a view illustrating a modified example of FIG. 2A.

FIG. 2B illustrates a unit structure 206 of the meta-grating surface structure in which three concave-shaped recessed structures are designed and periodically repeated in the recessed structure of the mode conversion reflector according to the embodiment. In this case, adjustable design variables may include a horizontal length (a) of the unit structure 206, a width ($d_1$) of a first recessed structure 207, a length ($l_1$) of the first recessed structure 207, a width ($d_2$) of a second recessed structure 208, a length ($l_2$) of a second recessed structure 208, a width ($d_3$) of a third recessed structure 209, a length ($l_3$) of a third recessed structure 209, an interval ($\alpha_{12}$) of the first recessed structure 207 and the second recessed structure 208, and an interval ($\alpha_{13}$) of the first recessed structure 207 and the third recessed structure 209.

When six design variables (a, $\alpha_{12}$, $d_1$, $d_2$, $l_1$, $l_2$) or nine design variables (a, $\alpha_{12}$, $\alpha_{13}$, $d_1$, $d_2$, $d_3$, $l_1$, $l_2$, $l_3$) of the protruding or recessed meta-grating surface structure may be appropriately adjusted, the meta-grating surface structure may be designed to mode-convert an incident ultrasonic wave with high efficiency and reflect the wave in a desired direction. The mode conversion reflector according to the embodiment may include, among the various structures described above, the meta-grating surface structure illustrated in FIGS. 1A and 1B, which has a convex-shaped protruding structure and a constituent material of which is the same as the incident elastic medium.

The meta-grating surface structure of the mode conversion reflector according to the embodiment may include a convex-shaped protruding structure or a concave-shaped recessed structure on the edge surface of the elastic medium which is convenient to be designed and processed. Compared to conventional technologies for controlling the directions of ultrasonic waves, the mode conversion reflector according to the embodiment controls all types, sizes, and directions of waves, thereby increasing the transmission efficiency of waves to be controlled, and further, designing and manufacturing may be convenient in that the simple concavo-convex shape is processed from raw materials.

In the case of utilizing the meta-grating surface structure of the mode conversion reflector according to the embodiment, an ultrasonic wave incident on the edge surface of the elastic medium may be mode-converted with high efficiency and simultaneously reflected in a desired direction. For example, the high-efficiency mode conversion and reflection in a desired direction means to transmit an ultrasonic wave incident toward the meta-grating surface structure to a desired position while mode-converting the wave with high energy efficiency and reflecting the wave. An ultrasonic wave includes a P wave (pressure wave) and an SV wave (shear vertical waves), which are plane waves propagating in-plane in an isotropic elastic medium. The elastic medium may be in a plane strain condition or a plane stress condition. The P wave is a longitudinal wave in which a direction of propagation of the wave and a direction of vibration of the medium are parallel to each other, and the SV wave is a shear wave or transverse wave in which a direction of propagation of the wave and a direction of vibration of the medium are perpendicular to each other. The mode conversion refers to a conversion of a type of wave, from a P wave, which is a longitudinal wave to an S wave, which is a transverse wave, or from an S wave, which is a transverse wave to a P wave, which is a longitudinal wave.

Figure 3A:
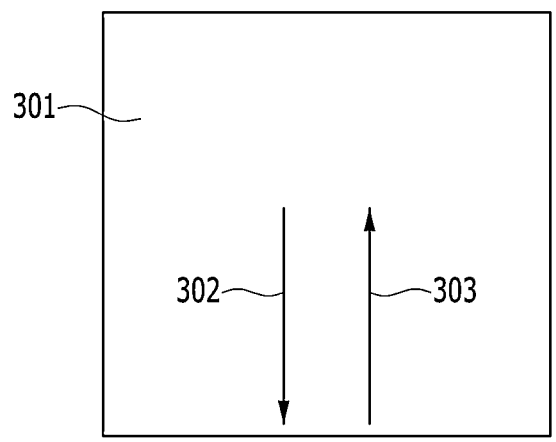
FIG. 3A is a view illustrating a situation in which an ultrasonic wave is incident vertically on a free boundary surface of an edge of an elastic medium.
Figure 3B:
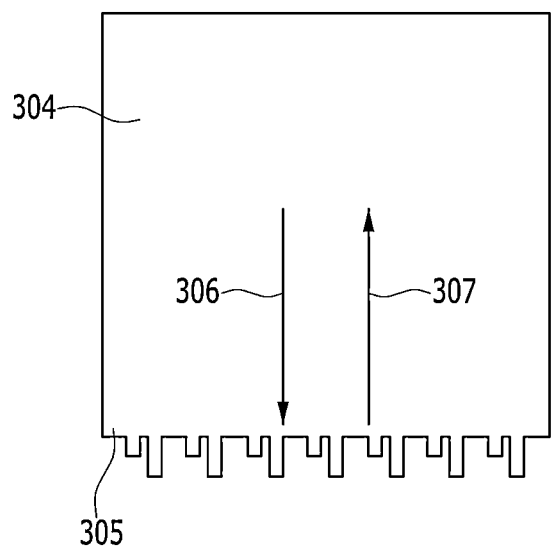
FIG. 3B is a view illustrating a situation in which an ultrasonic wave is mode-converted with high efficiency and simultaneously reflected vertically when the ultrasonic wave is vertically incident on the protruding structure of the mode conversion reflector according to the embodiment.

The embodiment provides the meta-grating surface structure in which an ultrasonic wave incident vertically to the edge surface of the elastic medium may be mode-converted with high efficiency and simultaneously reflected in a desired direction. When an ultrasonic wave is vertically incident on a free boundary surface of an edge of a general elastic medium, the same type of wave as the incident ultrasonic wave is reflected vertically, and a conceptual view thereof is illustrated in FIG. 3A. Here, when the meta-grating surface structure according to the embodiment is inserted into the edge surface of the elastic medium, the vertically incident ultrasonic wave may be mode-converted with high efficiency into a different type of wave and reflected vertically, and a conceptual view thereof is illustrated in FIG. 3B. In addition, when the meta-grating surface structure is properly designed, the vertically incident wave may be mode-converted and redirected into a different type of wave and reflected obliquely, and a conceptual view thereof is illustrated in FIG. 3C.

FIG. 3A is a view illustrating a situation in which an ultrasonic wave is vertically incident on a free boundary surface of an edge of a general elastic medium 301. Here, the incident ultrasonic wave 302 may be both a P wave and an SV wave. When the ultrasonic wave is vertically incident on the edge of the general elastic medium, an ultrasonic wave 303 of the same type as the incident ultrasonic wave may be vertically reflected.

FIG. 3B is a view illustrating a situation in which an ultrasonic wave is mode-converted with high efficiency and simultaneously reflected vertically when the ultrasonic wave is vertically incident on a structure in which an engineered meta-grating surface structure 305 is inserted into an edge surface of an elastic medium 304. Here, the vertically incident ultrasonic wave 306 may be a P wave. The vertically incident P wave may be vertically reflected as a different type of wave, an SV wave 307, by the engineered meta-grating surface structure.

Figure 3C:
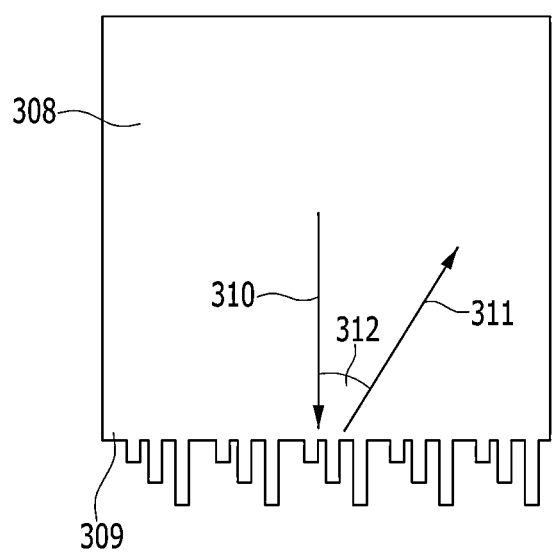
FIG. 3C is a view illustrating a situation in which an ultrasonic wave is mode-converted with high efficiency and simultaneously reflected with a reflection angle when ultrasonic waves are vertically incident on a modified protruding structure of the mode conversion reflector according to the embodiment.

FIG. 3C is a view illustrating a situation in which an ultrasonic wave is mode-converted with high efficiency and reflected with a specific reflection angle in the case that the ultrasonic wave is vertically incident when an engineered meta-grating surface structure 309 is inserted into an edge surface of an elastic medium 308. Here, the vertically incident ultrasonic wave 310 may be both a P wave and an SV wave, and may be a P wave in FIG. 3C. The vertically incident P wave is reflected at a specific angle 312 as an SV wave 311, which is a different type of wave, by the engineered meta-grating surface structure. In this case, the reflection angle 312 of the reflected wave 311 may be determined by the diffraction grating theory.

According to the diffraction grating theory in the elastic medium 308, waves of unwanted modes among several reflected waves can be offset through the meta-grating surface structure according to the embodiment.

When a wave encounters an obstacle or a narrow gap, the wave spreads and propagates to the back side, which is called diffraction. However, in the case of diffraction grating in which these obstacles are periodically connected, several waves interfere with each other. In this case, constructive interference or destructive interference occurs at a specific angle because of a mutual path difference. A wave whose strength is enhanced by constructive interference is referred to as an n-th mode depending on an angle. In the case of applying the diffraction grating theory in the elastic medium 308, the number of modes of a longitudinal or transverse wave that is diffracted and reflected in the elastic medium 308 where a length of the unit structure is determined may be determined. The number of modes that may be calculated is determined by adjusting the length of the unit structure, and the structure may be designed using shape optimization to cancel unwanted modes among the calculated modes.

For example, in FIG. 3B described above, when a longitudinal wave is incident, the length of the unit structure may be determined so that only one longitudinal wave and one transverse wave may be respectively reflected out. In addition, the shape optimization may be implemented to be capable of canceling out unwanted longitudinal modes. Since the number of diffraction modes of longitudinal and transverse waves is a total of two (one longitudinal wave+one transverse wave), it is possible to optimize the design by using two concavo-convex shapes per one unit structure.

In FIG. 3C, when a longitudinal wave is incident, the length of the unit structure may be determined so that only one longitudinal wave and three transverse waves may be reflected out, respectively. The shape optimization may be implemented to cancel out unwanted modes of longitudinal and transverse waves. Since the number of diffraction modes of longitudinal and transverse waves is a total of four (one longitudinal wave+three transverse waves), more degrees of freedom are required than FIG. 3B, thus enabling design optimization by three concave-convex shapes per one unit structure.

As illustrated in FIG. 1, the meta-grating surface structure of the mode conversion reflector according to the embodiment may include 6 design variables (a, $\alpha_{12}$, $d_1$, $d_2$, $l_1$, $l_2$) or 9 design variables (a, $\alpha_{12}$, $\alpha_{13}$, $d_1$, $d_2$, $d_3$, $l_1$, $l_2$, $l_3$). When a design system is determined, for example, when an incident medium, a reflective medium, an angle of incidence of an incident ultrasonic wave, an angle of reflection of a reflected ultrasonic wave, a frequency of the incident ultrasonic wave, a wave mode of the incident ultrasonic wave, and a wave mode of the reflected ultrasonic wave are determined, as illustrated in FIG. 3, the incident ultrasonic wave may be mode-converted and reflected in a desired direction by appropriately adjusting the design variables.

According to the embodiment, the meta-grating surface structure in which an ultrasonic wave incident vertically to an edge of an elastic medium is mode-converted with high efficiency and reflected in a desired direction and simulation analysis results are provided. According to the embodiment, constituent materials of the incident medium and the meta-grating surface structure may be aluminum. A case in which a P wave with a frequency of 60 kHz is incident vertically to an edge surface of an elastic medium and is reflected as an SV wave will be described. Here, it is possible to change a size of the meta-grating surface structure at an appropriate rate according to a frequency.

Figure 4A:
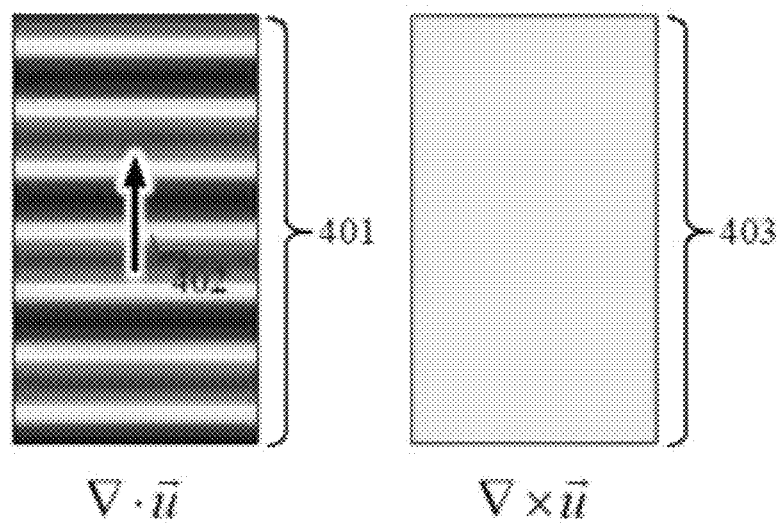
FIG. 4A is a view illustrating divergent and rotating fields for a reflection field displacement when a P wave is vertically incident on the free boundary surface of the edge of the elastic medium.
Figure 4B:
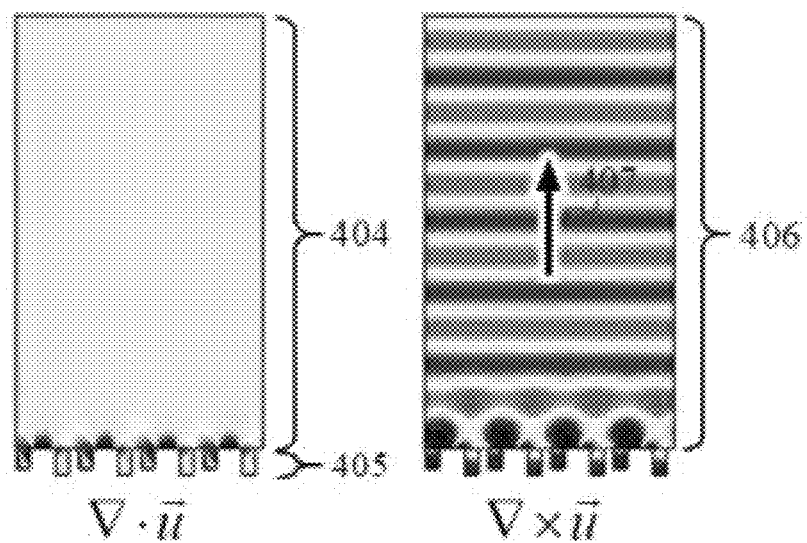
FIG. 4B is a view illustrating divergent and rotating fields for a reflection field displacement for a case in which an SV wave is vertically reflected when a P wave is vertically incident on the protruding structure of the mode conversion reflector according to the embodiment.
Figure 4C:
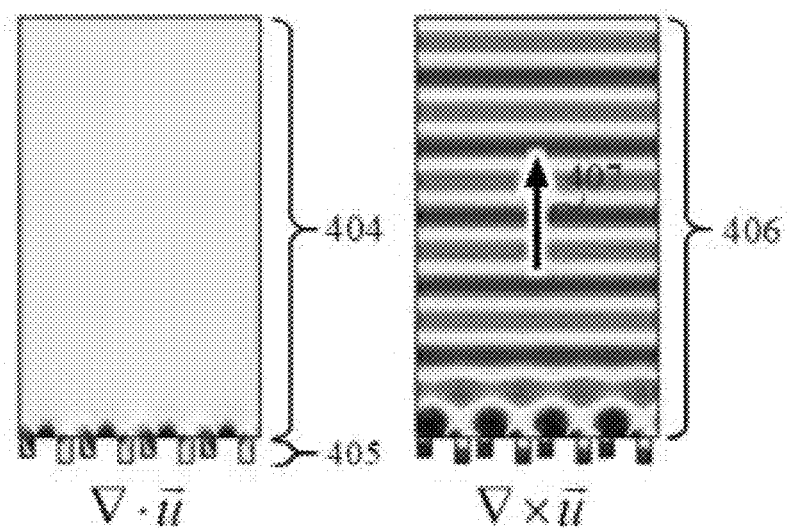
FIG. 4C is a view illustrating divergent and rotating fields for the reflection field displacement for a case in which an SV wave is reflected at a reflection angle smaller than the vertical when a P wave is vertically incident to the modified protruding structure of the mode conversion reflector according to the embodiment.

A simulation analysis result for the case where there is no meta-grating surface structure of the mode conversion reflector according to the embodiment is illustrated in FIG. 4A. FIG. 4 represents a divergent field $$(\nabla \cdot \vec{u})$$

and a rotating field $$(\nabla \cdot \vec{u})$$

for a reflection field displacement. Here, a magnitude and propagation direction of a P wave, which is a longitudinal wave, is represented through the divergent field, and a magnitude and propagation direction of an SV wave, which is a transverse wave, is represented through the rotating field. Simulation analysis results for the case where there is a meta-grating surface structure are illustrated in FIGS. 4B and 4C. The analysis results, as illustrated in FIGS. 4B and 4C, represent the divergent field $$(\nabla \cdot \vec{u})$$

and rotating field $$(\nabla \cdot \vec{u})$$

for the reflection field displacement for the cases where an SV wave is reflected vertically and reflected obliquely with a reflection angle when a P wave is incident vertically, respectively.

FIG. 4A is a view illustrating the divergent field $$(\nabla \cdot \vec{u})$$

and rotating field $$(\nabla \cdot \vec{u})$$

for the reflection field displacement for the case where a P wave is vertically incident on a free boundary surface of edge of a general elastic medium. In the case of a free boundary surface without a meta-grating surface structure, a P wave 402 is all reflected vertically in the divergent field 401 for the reflection field displacement, and an SV wave does not occur in the rotating field 403 for the reflection field displacement.

FIG. 4B is a meta-grating surface structure of the mode conversion reflector according to the embodiment and a view illustrating the divergent field $$(\nabla \cdot \vec{u})$$

and rotating field $$(\nabla \cdot \vec{u})$$

for the reflection field displacement for the case where an SV wave is reflected vertically when a P wave is incident vertically. In the case of a meta-grating surface structure 405 where a mode conversion reflection angle is designed to be 0 degree, a vertically incident P wave is mode-converted and does not appear in the divergent field 404 for the reflection field displacement. In the rotating field 406 for the reflection field displacement, a mode-converted SV wave 407 has high intensity and is reflected with a reflection angle of 0 degree.

FIG. 4C is a modified meta-grating surface structure of the mode conversion reflector according to the embodiment, and a view illustrating the divergent field $$(\nabla \cdot \vec{u})$$

and the rotating field $$(\nabla \cdot \vec{u})$$

for the reflection field displacement for the case where an SV wave is reflected at a reflection angle smaller than the vertical when a P wave is incident vertically. In the case of a meta-grating surface structure 409 with a mode conversion reflection angle of 45 degrees, a vertically incident P wave is mode-converted and does not appear in the divergent field 408 for the reflection field displacement. In the rotating field 410 for the reflection field displacement, a mode-converted SV wave 411 has high intensity and is reflected at a reflection angle of 45 degrees.

The mode conversion reflector according to the embodiment may be used for the development of high-efficiency non-destructive testing equipment that needs to transmit a desired type of wave to a desired location. For example, the mode conversion reflector according to the embodiment may be directly applied to the non-destructive testing equipment for detecting defects in pipes, plates, welds, etc., or wedges of non-invasive ultrasonic waves flowmeter equipment.

Figure 5:
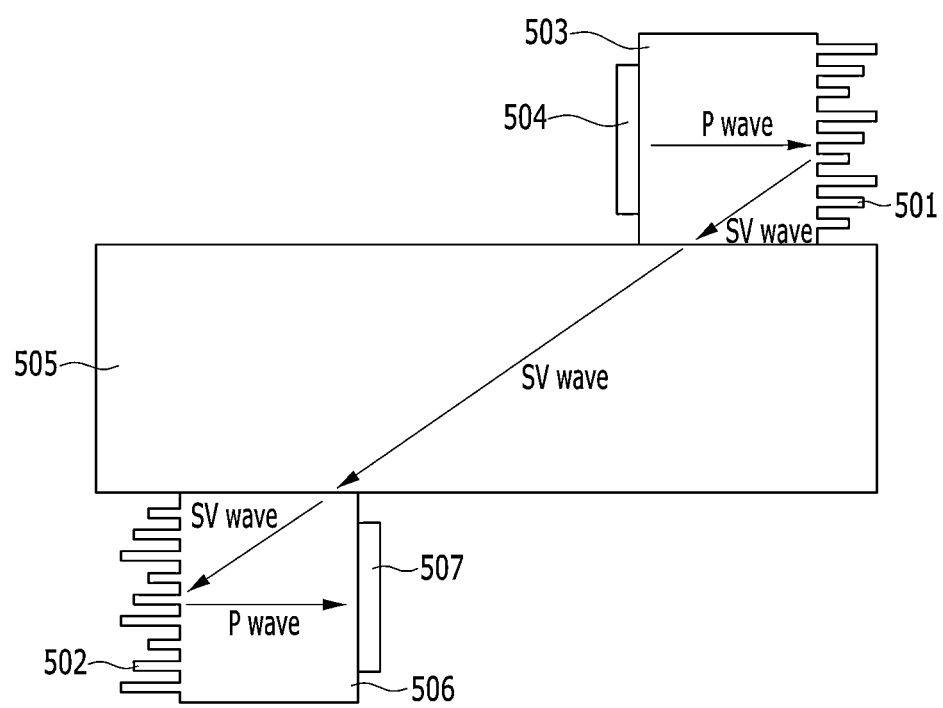
FIG. 5 is a view illustrating a wave propagation situation in which an ultrasonic wave generated from a transducer of a transmitting wedge passes through a specimen and reaches a transducer of a receiving wedge using the protruding structure of the mode conversion reflector according to the embodiment.
Figure 6:
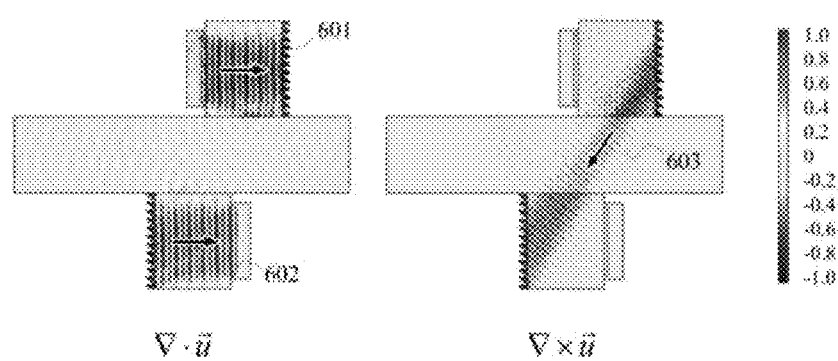
FIG. 6 is a view illustrating divergent and rotating fields for a displacement for a case in which transmitting/receiving wedges are configured using the protruding structure of the mode conversion reflector according to the embodiment and an ultrasonic wave is incident.
Figure 7:
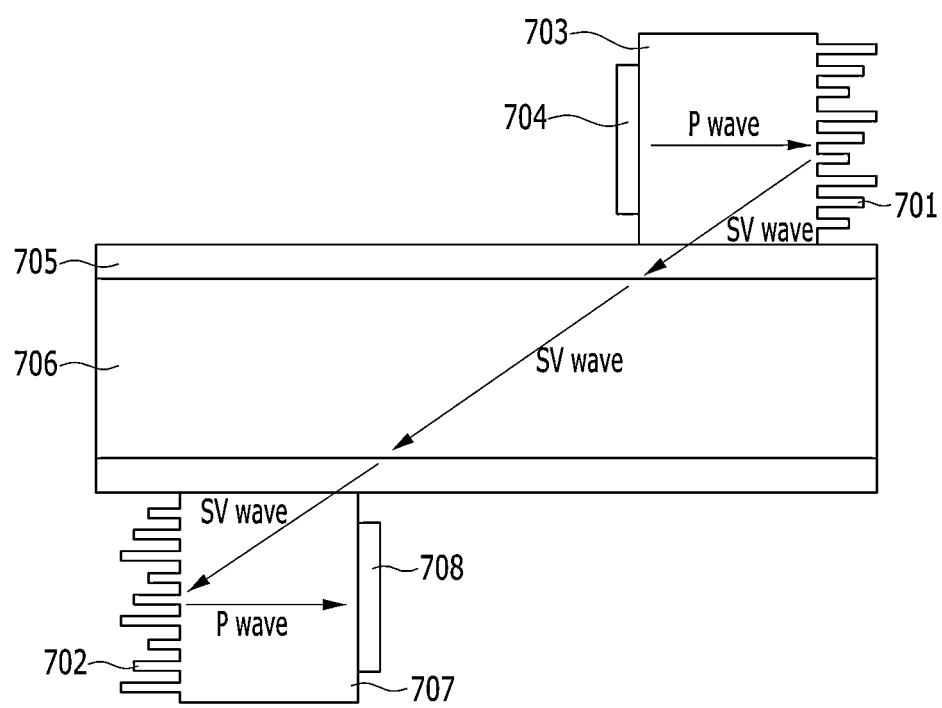
FIG. 7 is a view illustrating a wave propagation situation in which an ultrasonic wave generated from the transducer of the transmitting wedge passes through a pipe and a fluid to reach the transducer of the receiving wedge using the protruding structure of the mode conversion reflector according to the embodiment.

In addition, the mode conversion reflector according to the embodiment may be used as a wedge for the industrial ultrasonic waves non-destructive testing and non-invasive flowmeter equipment, and FIG. 5 illustrates the conceptual view thereof. In the case of utilizing the meta-grating surface structure, as illustrated in FIG. 5, an SV wave may be reflected at an angle at which an ultrasonic wave is capable of being transmitted with high efficiency at a boundary between a wedge and a specimen, thereby maximizing a size of a received signal. For verification, a simulation analysis may be performed using a commercial finite element analysis software, for example, COMSOL Multiphysics. A simulation analysis result is illustrated in FIG. 6. In the simulation, the material of the wedge is aluminum and the material of the specimen is iron. In addition, in FIG. 7, a concept of non-invasive flowmeter equipment using a wedge utilizing a meta-grating surface structure may be confirmed. As illustrated in FIG. 7, an ultrasonic wave generated through a transducer is mode-converted and transmitted into a flowmeter, thereby maximizing a size of a received signal of the flowmeter.

FIG. 5 illustrates a utilization of a meta-grating surface structures 501 and 502 of the mode conversion reflector according to the embodiment. Referring to FIG. 5, a wave propagation situation is illustrated, in which an ultrasonic wave generated from a transducer 504 of a transmitting wedge 503 penetrates a specimen 505 and reaches a transducer 507 of a receiving wedge 506. The transducer 504 of the transmitting wedge 503 generates a P wave, and the transducer 507 of the receiving wedge 506 analyzes the received P wave signal. The P wave generated by the transducer 504 of the transmitting wedge 503 is mode-converted into an SV wave by the engineered meta-grating surface structure 501 and reflected at a specific reflection angle. The reflected SV wave is incident on the specimen 505 and transmitted with high efficiency. The SV wave is incident in the receiving wedge 506. The SV wave incident at a specific angle is mode-converted into a P wave by the meta-grating surface structure 502, reflected vertically, and reaches the transducer 507. In the case of utilizing the meta-grating surface structure 501 and 502, an ultrasonic wave is mode-converted through the transmitting wedge 503 and the receiving wedge 506 and may be transmitted with high efficiency at a boundary of the specimen 505, thereby maximizing a size of a received signal.

FIG. 6 is a view illustrating a divergent field $$(\nabla \cdot \vec{u})$$

and a rotating field $$(\nabla \cdot \vec{u})$$

for a displacement for the case where transmitting/receiving wedges are configured using a meta-grating surface structure of the mode conversion reflector according to the embodiment and an ultrasonic wave is incident. In the divergent field and rotating field for the displacement, respectively, only P and SV waves are measured, and an amplitude of the field is proportional to an amplitude of each wave. First, a P wave 601 transmitted from the transmitting wedge is vertically incident on the meta-grating surface structure, mode-converted into an SV wave 603 and reflected at a reflection angle of 55 degrees, and penetrates a specimen made of iron. At a reflection angle of 55 degrees on the basis of the meta-grating surface structure (incident angle of 35 degrees on the basis of the specimen), there is almost no difference in impedance between the specimen made of iron and the wedge made of aluminum, and thus the transmittance is high. In the receiving wedge, the SV wave 603 is incident on the meta-grating surface structure at an incident angle of 55 degrees, mode-converted into a P wave 602 and reflected at a reflection angle of 0 degrees and received. Here, since intensity of the P wave reaching the receiving wedge is high, a wave transmission efficiency in the receiving wedge appears high. Accordingly, it may be confirmed that mode conversion through the meta-grating surface structure is performed with high efficiency. Therefore, the mode conversion reflector utilizing the meta-grating surface structure may be applied to the ultrasonic waves non-destructive testing equipment or non-invasive ultrasonic waves flowmeter equipment.

FIG. 7 is a view illustrating a wave propagation situation in which an ultrasonic wave generated from a transducer 704 of a transmitting wedge 703 penetrates a pipe 705 and a fluid 706 to reach a transducer 708 of a receiving wedge 707 by utilizing meta-grating surface structures 701 and 702 of the mode conversion reflector according to the embodiment. The transducer 704 of the transmitting wedge 703 generates a P wave, and the transducer 708 of the receiving wedge 707 analyzes a received P wave signal. The P wave generated by the transducer 704 of the transmitting wedge 703 is mode-converted into an SV wave by the engineered meta-grating surface structure 701 and reflected at a specific reflection angle. At an interface between the pipe 705 and the fluid 706, an efficiency of the transmitted wave is low due to a difference in impedance. In this case, since the impedance difference between the pipe and the fluid may be reduced by using the SV wave, which has a lower speed than the P wave, the SV wave is transmitted through the pipe 705 and the fluid 706 while maintaining a high efficiency. In the receiving wedge 707, the transmitted SV wave with high efficiency is incident. The SV wave incident at a specific angle is mode-converted into a P wave by the meta-grating surface structure 702 and is reflected vertically to reach a transducer 708. In the case of utilizing the meta-grating surface structures 701 and 702, an ultrasonic wave may be mode-converted through the transmitting wedge 703 and the receiving wedge 707 and may be transmitted with high efficiency at the boundary of the pipe 705, thereby maximizing a size of a received signal.

In the mode conversion reflector according to the embodiment, a concavo-convex shaped structure, which is convenient to be designed and manufactured, is designed on an edge surface of an elastic medium, so that an incident ultrasonic wave may be mode-converted (a type of wave is converted, from longitudinal to transverse, or from transverse to longitudinal) with high efficiency and reflected in a desired direction at the same time.

In addition, in the case of using the mode conversion reflector according to the embodiment, the problem of low energy efficiency of waves, which was difficult to solve with the conventional technologies for controlling the direction of ultrasonic waves, may be overcome.

The mode conversion reflector according to an embodiment may be applied to technical fields such as industrial ultrasonic non-destructive testing and flow meter fields. According to the mode conversion reflector according to the embodiment, ultrasonic waves of high energy efficiency are transmitted to a desired location, thereby improving the efficiency of detection and metering using the equipment.

While the exemplary embodiments of the present invention have been described above, the present invention is not limited thereto, and various modifications can be made and carried out within the scope of the claims, the detailed description of the invention, and the accompanying drawings, and also fall within the scope of the invention.

DESCRIPTION OF SYMBOLS

101: Meta-grating surface structure
102: Protruding structure
103: Unit structure

What is claimed is:

1. A mode conversion reflector comprising:
an elastic medium; and
a reflective layer formed of a non-planar structure on an edge surface of the elastic medium,
wherein an interference phenomenon caused by diffraction of wave occurs by the reflective layer, so that an ultrasonic wave incident through the elastic medium is mode-converted and reflected in a predetermined direction,
wherein the reflective layer comprises a meta-grating surface structure of a concavo-convex shape having an adjustable plurality of design variables,
wherein the reflective layer is provided with a plurality of convex-shaped protruding structures along a longitudinal direction in a unit structure, and
wherein a length of the unit structure is determined based on a number of modes of a longitudinal wave or a transverse wave diffracted and reflected in the elastic medium, and the unit structure is configured to cancel unwanted modes among the number of modes.

2. The mode conversion reflector of claim 1, wherein:
the unit structure comprises at least two units along the longitudinal direction.

3. The mode conversion reflector of claim 2, wherein:
the reflective layer is provided in a form in which two convex-shaped protruding structures have different protruding lengths and are periodically repeated along the longitudinal direction in the unit structure.

4. The mode conversion reflector of claim 3, wherein:
the plurality of design variables comprises a horizontal length (a) of the unit structure, a width ($d_1$) of a first protruding structure, a length ($l_1$) of the first protruding structure, a width ($d_2$) of a second protruding structure, a length ($l_2$) of the second protruding structure, and an interval ($\alpha_{12}$) of the first protruding structure and the second protruding structure.

5. The mode conversion reflector of claim 2, wherein:
the reflective layer is provided in a form in which three convex-shaped protruding structures have different protruding lengths and are periodically repeated along the longitudinal direction in the unit structure.

6. The mode conversion reflector of claim 5, wherein:
the plurality of design variables comprise a horizontal length (a) of the unit structure, a width ($d_1$) of a first protruding structure, a length ($l_1$) of the first protruding structure, a width ($d_2$) of a second protruding structure, a length ($l_2$) of the second protruding structure, a width ($d_3$) of a third protruding structure, a length ($l_3$) of the third protruding structure, an interval ($\alpha_{12}$) between the first protruding structure and the second protruding structure, and an interval ($\alpha_{13}$) between the first protruding structure and the third protruding structure.

7. The mode conversion reflector of claim 1, wherein:
the reflective layer is provided with a plurality of concave-shaped recessed structures along the longitudinal direction in the unit structure.

\* \* \* \* \*